(12) United States Patent
Chuong et al.

(10) Patent No.: US 9,297,312 B2
(45) Date of Patent: Mar. 29, 2016

(54) CIRCUMFERENTIALLY RETAINED FAIRING

(71) Applicant: United Technologies Corporation, Hartford, CT (US)

(72) Inventors: Conway Chuong, Manchester, CT (US); Jonathan Ariel Scott, Tolland, CT (US); Matthew Budnick, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 509 days.

(21) Appl. No.: 13/730,890

(22) Filed: Dec. 29, 2012

(65) Prior Publication Data

US 2014/0245750 A1    Sep. 4, 2014

(51) Int. Cl.
*F02C 7/20* (2006.01)
*F01D 25/28* (2006.01)
*F01D 25/16* (2006.01)

(52) U.S. Cl.
CPC ............... *F02C 7/20* (2013.01); *F01D 25/162* (2013.01); *F01D 25/28* (2013.01); *F05D 2250/42* (2013.01)

(58) Field of Classification Search
CPC ....... F02C 7/20; F05D 2260/30; F01D 25/28; F01D 25/162; F01D 25/164; F01D 25/246; F01D 9/042
USPC ......... 60/796, 797, 798, 805; 415/142, 208.1, 415/209.3, 209.4
See application file for complete search history.

(56) References Cited

U.S. PATENT DOCUMENTS

| | | | |
|---|---|---|---|
| 2,124,108 A | 7/1938 | Grece | |
| 2,836,959 A * | 6/1958 | McDowall et al. | ............. 60/797 |
| 3,576,328 A | 4/1971 | Vose | |
| 3,970,319 A | 7/1976 | Carroll et al. | |
| 4,088,422 A | 5/1978 | Martin | |
| 4,114,248 A | 9/1978 | Smith et al. | |
| 4,478,551 A | 10/1984 | Honeycutt, Jr. et al. | |
| 4,645,217 A | 2/1987 | Honeycutt, Jr. et al. | |
| 4,678,113 A | 7/1987 | Bridges et al. | |
| 4,738,453 A | 4/1988 | Ide | |
| 4,756,536 A | 7/1988 | Belcher | |
| 4,920,742 A | 5/1990 | Nash et al. | |
| 4,987,736 A | 1/1991 | Ciokajlo et al. | |
| 4,993,918 A | 2/1991 | Myers et al. | |
| 5,031,922 A | 7/1991 | Heydrich | |
| 5,042,823 A | 8/1991 | Mackay et al. | |
| 5,071,138 A | 12/1991 | Mackay et al. | |
| 5,100,158 A | 3/1992 | Gardner | |
| 5,108,116 A | 4/1992 | Johnson et al. | |
| 5,169,159 A | 12/1992 | Pope et al. | |
| 5,174,584 A | 12/1992 | Lahrman | |
| 5,188,507 A | 2/1993 | Sweeney | |
| 5,211,541 A | 5/1993 | Fledderjohn et al. | |
| 5,236,302 A | 8/1993 | Weisgerber et al. | |

(Continued)

OTHER PUBLICATIONS

International Searching Authority, PCT Notification of Transmittal of the International Search Report and the Written Opinion, Sep. 24, 2014, 10 pages.

*Primary Examiner* — Andrew Nguyen
(74) *Attorney, Agent, or Firm* — Kinney & Lange, P.A.

(57) ABSTRACT

An assembly for a gas turbine engine includes a frame, a mount, and a fairing. The mount is attached to the frame and the fairing is connected to the mount. The fairing and mount have mating anti-deflection features that engage to prevent circumferential movement of the fairing relative to the frame.

13 Claims, 5 Drawing Sheets

(56) References Cited

U.S. PATENT DOCUMENTS

| | | | |
|---|---|---|---|
| 5,246,295 A | 9/1993 | Ide | |
| 5,273,397 A | 12/1993 | Czachor et al. | |
| 5,338,154 A | 8/1994 | Meade et al. | |
| 5,370,402 A | 12/1994 | Gardner et al. | |
| 5,385,409 A | 1/1995 | Ide | |
| 5,401,036 A | 3/1995 | Basu | |
| 5,474,305 A | 12/1995 | Flower | |
| 5,558,341 A | 9/1996 | McNickle et al. | |
| 5,632,493 A | 5/1997 | Gardner | |
| 5,634,767 A * | 6/1997 | Dawson | 415/134 |
| 5,755,445 A | 5/1998 | Arora | |
| 5,911,400 A | 6/1999 | Niethammer et al. | |
| 5,961,279 A | 10/1999 | Ingistov | |
| 6,196,550 B1 | 3/2001 | Arora et al. | |
| 6,343,912 B1 | 2/2002 | Manteiga et al. | |
| 6,364,316 B1 | 4/2002 | Arora | |
| 6,439,841 B1 | 8/2002 | Bosel | |
| 6,601,853 B2 | 8/2003 | Inoue | |
| 6,619,030 B1 | 9/2003 | Seda et al. | |
| 6,637,751 B2 | 10/2003 | Aksit et al. | |
| 6,638,013 B2 | 10/2003 | Nguyen et al. | |
| 6,652,229 B2 | 11/2003 | Lu | |
| 6,672,833 B2 | 1/2004 | MacLean et al. | |
| 6,736,401 B2 | 5/2004 | Chung et al. | |
| 6,805,356 B2 | 10/2004 | Inoue | |
| 6,811,154 B2 | 11/2004 | Proctor et al. | |
| 6,935,631 B2 | 8/2005 | Inoue | |
| 6,983,608 B2 | 1/2006 | Allen, Jr. et al. | |
| 7,094,026 B2 | 8/2006 | Coign et al. | |
| 7,238,008 B2 | 7/2007 | Bobo et al. | |
| 7,367,567 B2 | 5/2008 | Farah et al. | |
| 7,371,044 B2 | 5/2008 | Nereim | |
| 7,631,879 B2 | 12/2009 | Diantonio | |
| 7,735,833 B2 | 6/2010 | Braun et al. | |
| 7,798,768 B2 | 9/2010 | Strain et al. | |
| 8,069,648 B2 | 12/2011 | Snyder et al. | |
| 8,083,465 B2 | 12/2011 | Herbst et al. | |
| 8,152,451 B2 | 4/2012 | Manteiga et al. | |
| 8,221,071 B2 | 7/2012 | Wojno et al. | |
| 8,245,518 B2 | 8/2012 | Durocher et al. | |
| 2003/0025274 A1 | 2/2003 | Allan et al. | |
| 2003/0042682 A1 | 3/2003 | Inoue | |
| 2003/0062684 A1 | 4/2003 | Inoue | |
| 2003/0062685 A1 | 4/2003 | Inoue | |
| 2005/0046113 A1 | 3/2005 | Inoue | |
| 2005/0135928 A1 | 6/2005 | Servadio et al. | |
| 2010/0132371 A1 | 6/2010 | Durocher et al. | |
| 2010/0132373 A1 | 6/2010 | Durocher et al. | |
| 2010/0132374 A1 | 6/2010 | Manteiga et al. | |
| 2010/0132377 A1 | 6/2010 | Durocher et al. | |
| 2010/0135770 A1 * | 6/2010 | Durocher et al. | 415/69 |
| 2010/0307165 A1 | 12/2010 | Wong et al. | |
| 2011/0000223 A1 * | 1/2011 | Russberg | 60/796 |
| 2011/0214433 A1 | 9/2011 | Feindel et al. | |
| 2011/0262277 A1 | 10/2011 | Sjoqvist et al. | |
| 2012/0111023 A1 | 5/2012 | Sjoqvist et al. | |
| 2012/0308367 A1 * | 12/2012 | Luczak | 415/173.1 |

* cited by examiner

CIRCUMFERENTIALLY RETAINED FAIRING

BACKGROUND

The invention relates to gas turbine engines, and more particularly to a mount for stator components of gas turbine engines.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

Turbine vane assemblies and other aircraft engine components may experience adverse modal response during engine operation. Some of these modes may be within the engine operation speed envelope and may cause excessive vibration that reduces the life of the components. Conventional ways to retain turbine hardware from such modal response includes the use of pins or hooks to dampen the parts. Oftentimes components must be retained at multiple locations to meet desired tolerances and for safety purposes. Multiple retention points with hooks or pins can create the risk of component over-constraint and binding.

SUMMARY

An assembly for a gas turbine engine includes a frame, a mount, and a fairing. The mount is attached to the frame and the fairing is connected to the mount. The fairing and mount have mating anti-deflection features that engage to prevent circumferential movement of the fairing relative to the frame.

An assembly for a gas turbine engine includes a frame and a fairing. The fairing defines a gas flow path for the gas turbine engine and has a first fixed connection to the frame and a second connection to the frame. The second connection allows for both radial and axial movement of the fairing relative to the frame while preventing circumferential movement of the fairing relative to the frame.

A turbine section for a gas turbine engine includes a turbine frame, a fairing, and a mount. The turbine frame is disposed along an axial length the turbine section and the fairing is disposed within the turbine frame to form a gas path for the turbine section. The mount is attached between the fairing and the turbine frame. The mount and the fairing have mating features that constrain the fairing from movement in a circumferential direction with respect to the frame but the mating features allow for unconstrained movement of the fairing in both a radial and an axial direction relative to the frame.

DETAILED DESCRIPTION

The invention discloses a castellated mount such as a ring with slots therein. The slots mate with a series of lugs or teeth provided by a fairing. The mount is bolted or otherwise connected to a stator component such as a frame. The mating lug and slot configuration allows the fairing to grow radially and axially relative to the frame but constrains the fairing from circumferential movement relative to the frame.

Figure 1:
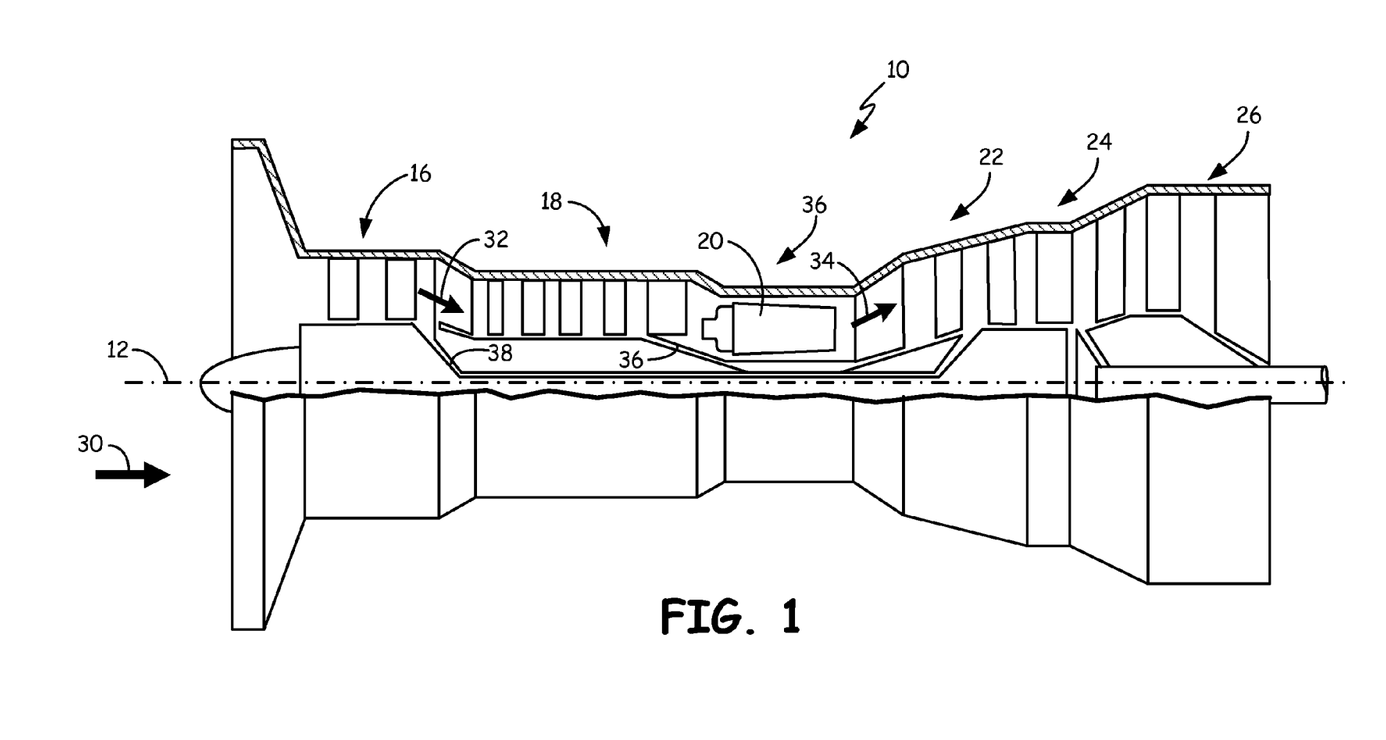
FIG. 1 is a partial cross-sectional view of an exemplary gas turbine engine.

An exemplary industrial gas turbine engine 10 is circumferentially disposed about a central, longitudinal axis or axial engine centerline axis 12 as illustrated in FIG. 1. The engine 10 includes in series order from front to rear, low and high pressure compressor sections 16 and 18, a central combustor section 20 and high and low pressure turbine sections 22 and 24. In some examples, a free turbine section 26 is disposed aft of the low pressure turbine 24. Although illustrated with reference to an industrial gas turbine engine, this application also extends to aero engines with a fan or gear driven fan, and engines with more or fewer sections than illustrated.

As is well known in the art of gas turbines, incoming ambient air 30 becomes pressurized air 32 in the compressors 16 and 18. Fuel mixes with the pressurized air 32 in the combustor section 20, where it is burned to produce combustion gases 34 that expand as they flow through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown).

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications.

Figure 2:
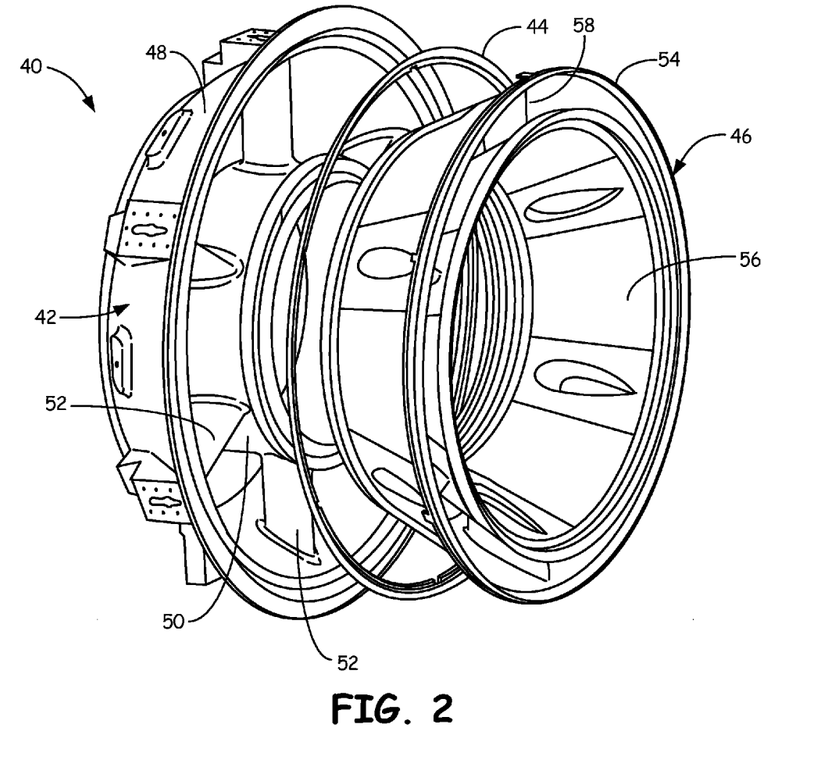
FIG. 2 is an exploded view of an assembly including a fairing, a ring, and a frame.

FIG. 2 shows an exploded view of an assembly 40. Assembly 40 includes frame 42, mount 44, and fairing 46. Frame 42 includes outer radial platform 48, inner radial platform 50, and struts 52. Fairing 46 includes outer radial surface 54, inner radial surface 56, and vanes 58.

Frame 42 comprises a stator component of gas turbine engine 10 (FIG. 1) and can form portions of compressor sections 16 and 18 or turbine sections 22 and 24. Mount 44 is illustrated as a full crenellated ring that is adapted to be attached to frame 42. However, in other embodiments mount 44 may be segmented and comprise less than a full ring or may be eliminated from assembly 40 entirely. Fairing 46 is connected to the mount 44 when installed. Additionally, when installed fairing 46 is disposed within the frame 42 to form a gas path for a portion of gas turbine engine 10. As will be discussed subsequently, fairing 46 and mount 44 have mating anti-deflection features that engage to prevent circumferential movement of the fairing 46 relative to the frame 42.

As illustrated in FIG. 2, outer radial platform 48 of frame 42 is conically shaped and forms a portion of the casing of gas turbine engine 10 (FIG. 1), for example, in low pressure turbine section 24. Inner radial platform 50 is disposed generally radially inward of outer radial platform 48 and is connected thereto by struts 52.

Mount 44 is adapted to be affixed to an axial end of outer radial platform 48. However, in other embodiments mount 44 can be affixed to inner radial platform 50 or to an intermediate portion of outer radial platform 48 that is not at or adjacent an axial end thereof.

Fairing 46 is adapted to be disposed within frame 42 between outer radial platform 48 and inner radial platform 50. Outer radial surface 54 of fairing 46 has a generally conical shape. Similarly, inner radial surface 56 has a generally conical shape. Inner radial surface 56 is spaced from outer radial surface 54 by vanes 58. Vanes 58 are adapted to be disposed around struts 52 of frame 42 when fairing 46 is assembled on frame 42. As discussed previously, outer radial surface 54, inner radial surface 56, and vanes 58, form the gas path for a portion of gas turbine engine 10 when assembled. In other sections or components within the engine, outer radial surface 54 and inner radial surface 56 may have generally cylindrical shapes as well.

Figure 3:
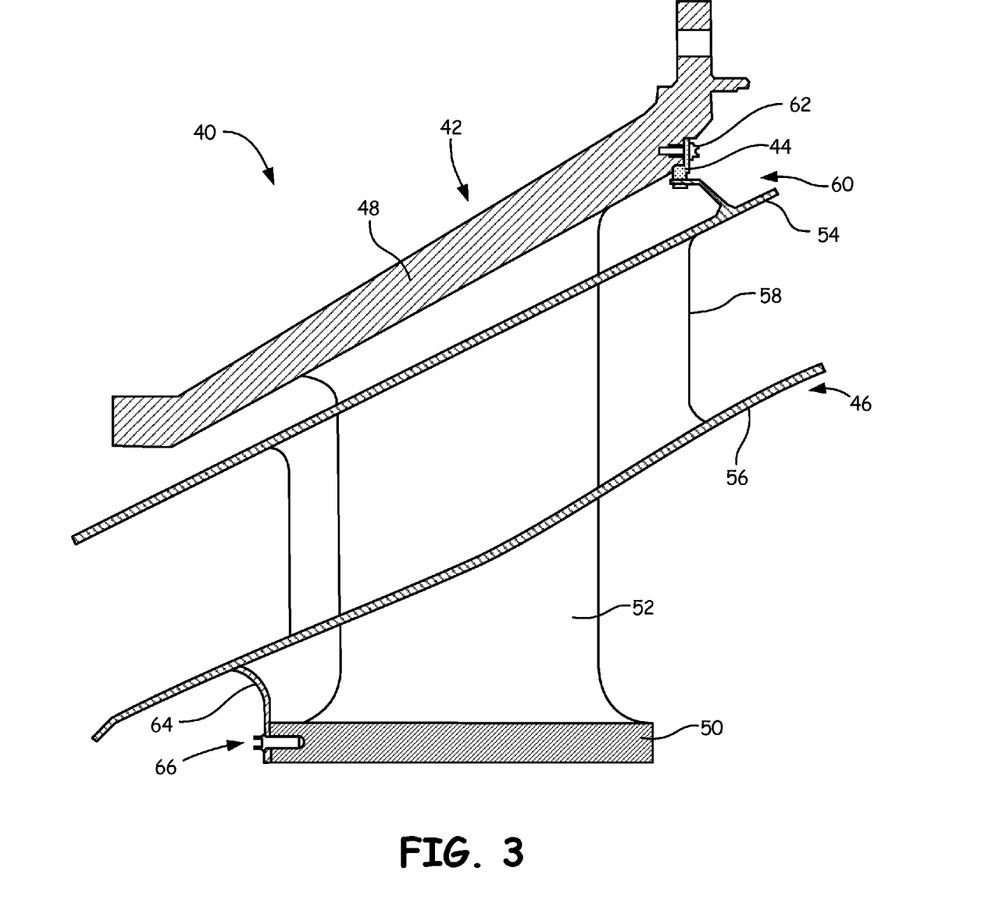
FIG. 3 is a cross-section of the assembly of FIG. 2 including the fairing, ring, and frame arranged together.

FIG. 3 shows a cross-section of assembly 40 with fairing 46 installed within frame 42. In addition to mount 44, outer radial platform 48, inner radial platform 50, struts 52 (only one is shown in FIG. 3), outer radial surface 54, inner radial surface 56, and vanes 58, assembly 40 additionally includes anti-deflection features 60, first fasteners 62, flange 64, and second fastener 66.

In FIG. 3, mount 44 is attached to an end of outer radial platform 48 by first fasteners 62 (only one is shown in FIG. 3). Outer radial surface 54 of fairing 46 is adapted with anti-deflection features 60 such that fairing 46 engages mount 44. In particular, anti-deflection features 60 of mount 44 and fairing 46 are adapted to mate together but allow fairing 46 to move both radially and axially relative to frame 42. Anti-deflection features 60 act to constrain fairing 46 from circumferential movement relative to frame 42 and mount 44. As will be discussed subsequently, in the embodiment shown in FIG. 3 anti-deflection features 60 comprise slots in mount 44 and lugs that extend from fairing 46. Slots and lugs are adapted to mate and engage in a circumferential direction to prevent relative movement of fairing 46 with respect to frame 42.

Flange 64 extends from inner radial surface 56 of fairing 46 and engages a second axial end of inner radial platform 50. Flange 64 is connected thereto by second fastener 66. Second fastener 66 provides for axial, radial, and circumferential constraint of the axially forward portion of fairing 46 relative to frame 42. Thus, fairing 46 has a fixed connection (i.e., is radially, axially, and circumferentially constrained relative to the frame 42) to the frame 42 at a first location and has a second connection (via anti-deflection features 60) with axial and radial degrees of freedom at a second location. In other possible embodiments, the attachment at the first location may provide only axial constraints relative to the frame 42, and may exist at other locations on the frame 42.

Anti-deflection features 60 allow for thermal growth and vibration dampening as needed to achieve desired component life. Anti-deflection features 60 do not over-constrain fairing 46 since mount 44 protects only against circumferential movement of fairing 46 relative to frame 42. Additionally, mount 44 can be removed and replaced easily in the event of excessive wear, thus saving time and money. Anti-deflection features 60 also allow for simplicity of design compared to more complicated retention arrangements that require additional components or fabrication steps to manufacture.

Figure 4:
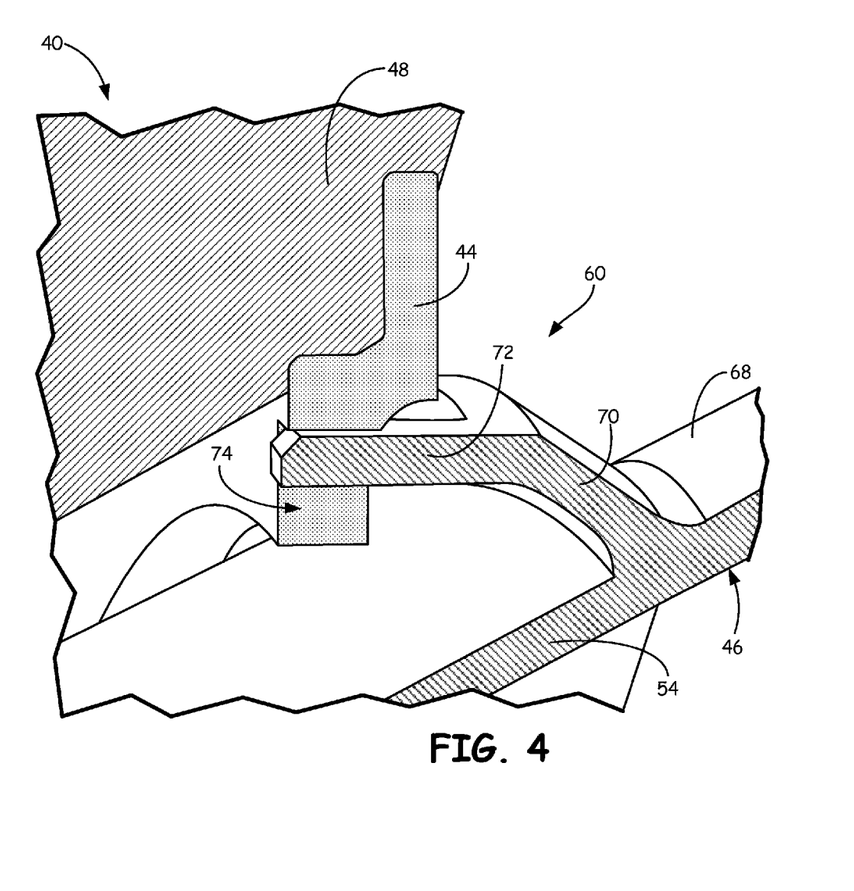
FIG. 4 is an enlarged cross-section of the ring and fairing specifically showing a lug and slot mount configuration.

FIG. 4 shows a cross-section of a portion of assembly 40, in particular, anti-deflection features 60. The portion of assembly 40 shown in FIG. 4 illustrates outer radial platform 48, mount 44, and outer radial surface 54. Additionally, anti-deflection features 60 include flange 68, stiffening rail 70, lugs 72 and slots 74.

As shown in FIG. 4, flange 68 is formed from outer radial surface 54 of fairing 46. However, in other embodiments flange 68 and/or stiffening rail 70 can be bolted or to or otherwise connected to outer radial surface 54. Stiffening rail 70 extends radially and axially away from flange 68 and the remainder of outer radial surface 54. Lugs 72 (only one in shown in FIG. 4) are connected to and extend generally axially away from stiffening rail 70. Lugs 72 are received in slots 74 (only one is shown in FIG. 4) in mount 44. However, in other embodiments the lugs 72 may also extend axially and/or radially away from the stiffening rail 70, and the slots 74 may be adapted accordingly.

As previously discussed, lugs 72 and slots 74 are adapted to mate together but have a clearance to allow fairing 46 to grow radially and axially relative to outer radial platform 48 of frame 42 (FIGS. 2 and 3). However, lugs 72 are arranged to make contact with sides of slots 74 in a circumferential direction. This arrangement acts to constrain fairing 46 from circumferential movement relative to outer radial platform 48 and mount 44.

Figure 5:
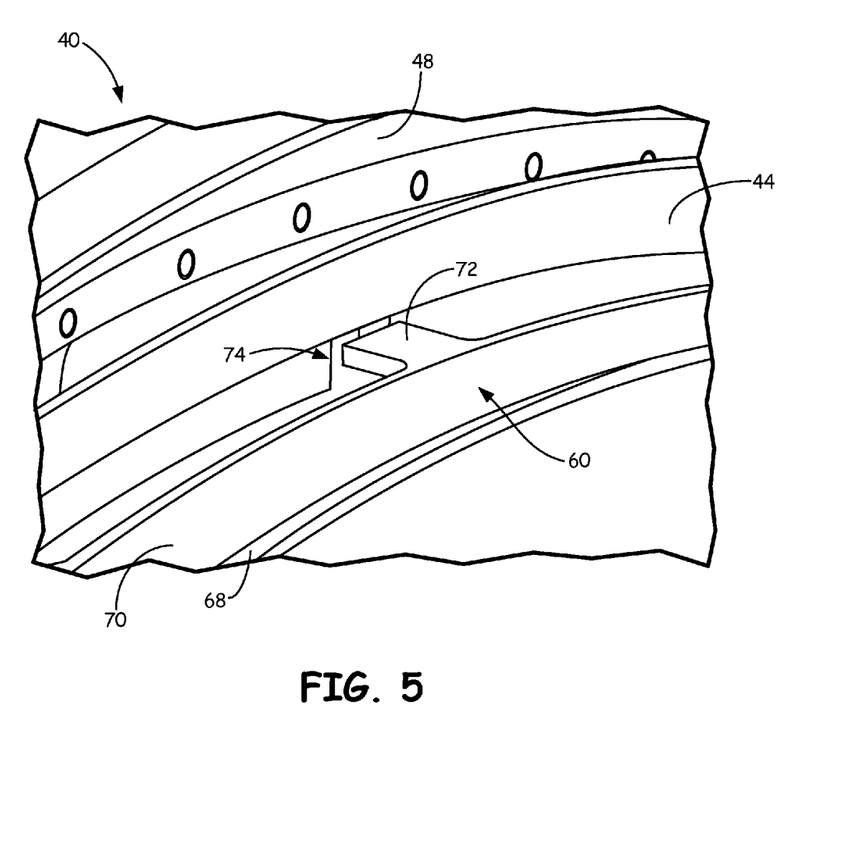
FIG. 5 is an exploded perspective view showing the lug and slot mount configuration.

FIG. 5 shows an exploded perspective view of a portion of assembly 40, in particular, anti-deflection features 60. The portion of assembly 40 shown in FIG. 5 illustrates outer radial platform 48, mount 44, flange 68, stiffening rail 70, lugs 72 and slots 74.

Stiffening rail 70 extends radially and axially away from flange 68 and the remainder of fairing 46 (FIGS. 2-4). Lugs 72 (only one in shown in FIG. 5) are connected to and extend generally axially away from stiffening rail 70. Lugs 72 are adapted to be received in slots 74 (only one is shown in FIG. 5) in mount 44.

Although illustrated with lugs 72 extending from fairing 46 (FIGS. 2-4), in other embodiments mount 44 can be adapted with lugs and fairing components such as stiffening rail 70 can have slots that receive the lugs of the mount.

The invention discloses a castellated mount such as a ring with slots therein. The slots mate with a series of lugs or teeth provided by a fairing. The mount is bolted or otherwise connected to a stator component such as a frame. The mating lug and slot configuration allows the fairing to grow radially and axially relative to the frame but constrains the fairing from circumferential movement relative to the frame.

Discussion of Possible Embodiments

The following are non-exclusive descriptions of possible embodiments of the present invention.

An assembly for a gas turbine engine includes a frame, a mount, and a fairing. The mount is attached to the frame and the fairing is connected to the mount. The fairing and mount have mating anti-deflection features that engage to prevent circumferential movement of the fairing relative to the frame The assembly of the preceding paragraph can optionally include, additionally and/or alternatively, any one or more of the following features, configurations and/or additional components:

the mount is attached to a first axial end portion of the frame;

the mount is attached to the frame by a first fastener and the fairing is attached to a second axial end portion of the frame by a second fastener;

the mount is attached to an outer radial platform of the frame and the fairing is additionally attached to an inner radial platform of the frame;

the frame comprises a turbine frame;

the mount comprises a ring;

the ring has one or more slots therein, the fairing has one or more lugs extending therefrom, and the one or more lugs are received in the one or more slots when the fairing is disposed within the frame; and the fairing is unconstrained from movement in both a radial and an axial direction relative to the frame but is constrained from movement in a circumferential direction with respect to the frame.

An assembly for a gas turbine engine includes a frame and a fairing. The fairing defines a gas flow path for the gas turbine engine and has a first fixed connection to the frame and a second connection to the frame. The second connection allows for both radial and axial movement of the fairing relative to the frame while preventing circumferential movement of the fairing relative to the frame.

The assembly of the preceding paragraph can optionally include, additionally and/or alternatively, any one or more of the following features, configurations and/or additional components:

a mount attached to the frame;

the mount comprises a ring and the mating features comprise one or more slots in the ring and one or more lugs on the fairing;

the ring is mounted to a first axial end portion of the frame;

the ring is mounted to the frame by a first fastener and the fairing is mounted to a second axial end portion of the frame by a second fastener;

the ring is mounted to an outer radial platform of the frame and the fairing is mounted to an inner radial platform of the frame; and the frame comprises a turbine frame.

A turbine section for a gas turbine engine includes a turbine frame, a fairing, and a mount. The turbine frame is disposed along an axial length the turbine section and the fairing is disposed within the turbine frame to form a gas path for the turbine section. The mount is attached between the fairing and the turbine frame. The mount and the fairing have mating features that constrain the fairing from movement in a circumferential direction with respect to the frame but the mating features allow for unconstrained movement of the fairing in both a radial and an axial direction relative to the frame.

The turbine section of the preceding paragraph can optionally include, additionally and/or alternatively, any one or more of the following features, configurations and/or additional components:

the mount comprises a ring;

the mating features comprise one or more slots in the ring and one or more lugs on the fairing;

the fairing is attached at a first axial end portion to the frame by a fastener and is constrained from movement in a circumferential direction with respect to the frame at a second axial end portion of the fairing; and the mount is attached to an outer radial platform of the frame.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for a gas turbine engine comprising:
a frame;
a strut extending from the frame;
a mount attached to the frame, the mount comprising:
a ring extending around an engine centerline and having one or more slots therein, wherein each slot has side walls extending in a radial direction relative to the frame and an end wall joining the side walls; and
a fairing connected to the mount, the fairing comprising:
an outer radial surface;
an inner radial surface;
a vane extending from the outer radial surface to the inner radial surface, wherein the vane is disposed around the strut; and
one or more lugs extending from one of the outer and inner radial surfaces that have mating walls, each mating wall extending in a substantially axial direction relative to the frame and disposed opposite one of the side walls of one of the slots,
wherein the one or more lugs are received in the one or more slots; wherein the one or more lugs of the fairing and the one or more slots of the mount are mating anti-deflection features that engage to allow unconstrained movement of the fairing in both the radial direction and the axial direction relative to the frame but is constrained from movement in a circumferential direction with respect to the frame.

2. The assembly of claim 1, wherein the mount is attached to a first axial end portion of the frame.

3. The assembly of claim 2, wherein the mount is attached to the frame by a first fastener and wherein the fairing is attached to a second axial end portion of the frame by a second fastener.

4. The assembly of claim 3, wherein the mount is attached to an outer radial platform of the frame and the fairing is additionally attached to an inner radial platform of the frame.

5. The assembly of claim 1, wherein the frame comprises a turbine frame.

6. An assembly for a gas turbine engine, comprising:
a frame;
a strut extending from the frame;
a mount attached to the frame, the mount comprising:
a ring extending around an engine centerline and having one or more slots therein, wherein each slot has side walls extending in a radial direction relative to the frame and an end wall joining the side walls; and a fairing that defines a gas flow path for the gas turbine engine, wherein the fairing is disposed around the strut and has a first fixed connection to the frame and a second connection to the frame, and wherein the second connection allows for both radial and axial movement of the fairing relative to the frame while preventing circumferential movement of the fairing relative to the frame, and wherein the second connection comprises:
one or more lugs extending from the fairing, wherein each lug has mating walls extending in a substantially axial direction relative to the frame, each mating wall disposed opposite one of the side walls of one of the slots, and wherein the one or more lugs are received in the one or more slots.

7. The assembly of claim 6, wherein the ring is mounted to a first axial end portion of the frame.

8. The assembly of claim 6, wherein the ring is mounted to the frame by a first fastener and the fairing is mounted to a second axial end portion of the frame by a second fastener.

9. The assembly of claim 7, wherein the ring is mounted to an outer radial platform of the frame and the fairing is mounted to an inner radial platform of the frame.

10. The assembly of claim 6, wherein the frame comprises a turbine frame.

11. A turbine section for a gas turbine engine, comprising:
a turbine frame disposed along an axial length of the turbine section;
a strut extending from the turbine frame;
a fairing disposed within the turbine frame to form a gas path for the turbine section, the fairing comprising:
an outer radial surface;
an inner radial surface; and
a vane extending from the outer radial surface to the inner radial surface, wherein the vane is disposed around the strut; and
a mount attached between the fairing and the turbine frame, wherein the mount comprises a ring extending around an engine centerline, wherein the mount and the fairing have mating features that constrain the fairing from movement in a circumferential direction with respect to the turbine frame but the mating features allow for unconstrained movement of the fairing in both a radial and an axial direction relative to the turbine frame, and wherein the mating features comprise:
one or more slots within the ring, wherein each slot has side walls extending in a radial direction of the turbine frame and an end wall joining the side walls; and
one or more lugs extending from the fairing, wherein each lug has mating walls extending in a substantially axial direction relative to the turbine frame, each mating wall disposed opposite one of the side walls of one of the slots, and wherein the one or more lugs are received in the one or more slots.

12. The turbine section of claim 11, wherein the fairing is attached at a first axial end portion to the frame by a fastener and is constrained from movement in the circumferential direction with respect to the frame at a second axial end portion of the fairing.

13. The turbine section of claim 11, wherein the mount is attached to an outer radial platform of the frame.

* * * * *